United States Patent [19]

Beswick

[11] 4,037,623
[45] July 26, 1977

[54] VARIABLE O-RING CONTROL VALVE
[76] Inventor: Paul R. Beswick, 128 Topsfield Road, Ipswich, Mass. 01938
[21] Appl. No.: 647,364
[22] Filed: Jan. 8, 1976
[51] Int. Cl.$^2$ .............................................. F16K 5/10
[52] U.S. Cl. .............................. 137/599; 251/DIG. 1; 251/208; 251/209; 251/345
[58] Field of Search ............... 251/208, 209, DIG. 1, 251/205, 206, 207, DIG. 2, 345; 137/599

[56] References Cited
U.S. PATENT DOCUMENTS

| | | | |
|---|---|---|---|
| 1,366,151 | 1/1921 | Astrom | 251/DIG. 1 |
| 3,005,468 | 10/1961 | Erwin et al. | 251/345 X |
| 3,033,226 | 5/1962 | Allen | 251/345 X |
| 3,154,104 | 10/1964 | Alamprese | 251/DIG. 2 |
| 3,195,573 | 7/1965 | Daumy | 251/DIG. 2 |
| 3,847,178 | 11/1974 | Keppel | 251/DIG. 1 |

Primary Examiner—Arnold Rosenthal

[57] ABSTRACT

A sleeve valve having control of the rate of fluid flow therethrough by rotation of an outer sleeve is disclosed. Fluid flows in through a longitudinal bore in a valve body, then outward through one or more radial apertures extending outward from the longitudinal bore. An O-ring which is mounted eccentrically within a sleeve positioned around the valve body covers the radial aperture to an amount depending upon the angular position of the sleeve with respect to the valve body. The invention encompasses both flow control and metering valves. A linear or other desired relationship between angular position of the sleeve with respect to the valve body versus flow rate of fluid through the valve may be achieved.

17 Claims, 14 Drawing Figures

FIG. 13

VARIABLE O-RING CONTROL VALVE

BACKGROUND OF THE INVENTION

1. Field of the Invention

The invention relates to control valves and particularly to sleeve valves in which the rate of fluid flow through the valve is dependent upon the rotational position of the sleeve with respect to the valve body.

2. Description of the Prior Art

Often in the control and utilization of fluids it is required to vary the flow rate of the fluid on one or both directions with a valve that is insertable directly within fluid line or circuit. The most common prior method for accomplishing fluid control was with the use of a needle valve which employed a tapered shaft valve needle the position of which was adjustable with respect to a valve seat. Such valves suffered from a number of disadvantages. To construct such a valve in which the position of the control needle was variable by rotation of an external sleeve was mechanically complicated, difficult to manufacture, and consequently somewhat expensive. The rate of flow as a function of control needle position with respect to the distance to the valve seat was non-linear. The amount of control effected was disproportionately large for small amounts of needle position change so that a large increase or decrease in the rate of fluid flow through the valve was effected for small changes in needle position near valve closure. This effect was especially bothersome where high precision of control is required over a broad range of fluid flow rates.

Other prior art devices included one in which a metering disk was placed within the flow path of the fluid and the disk rotated at an angle to the direction of flow of the fluid to vary the rate of flow. Unfortunately, such devices suffered from many of the disadvantages of the previously described needle valve including the difficulty of attaining a precise control over the flow rate of fluids at small fluid flow rates and over a large range of fluid flow rates.

Devices were constructed with numerous differently shaped objects placed in the path of fluid control the position of which was movable to vary the rate at which fluid flowed through the valve by changing the cross-section of the aperture through which the fluid was restricted to pass. Many of the devices again suffered from the aforementioned problems attaining a fine degree of control over the flow rate of the fluid. Additionally, many were difficult to manufacture as exotically shaped aperture varying means were difficult to manufacture using standard machining techniques. Furthermore, in both needle and dish type valves, hysteresis problems casued the flow rate to be different depending upon whether the desired control position was approached from a higher or lower flow rate.

SUMMARY OF THE INVENTION

Accordingly, it is an object of the present invention to provide a control valve in which precise control over the rate of fluid flow through the valve is achieved over a wide range of fluid flow rates and especially at low fluid flow rates.

Also, it is an object of the invention to provide a sleeve control valve in which the rate of flow of fluid through the valve is varied by rotating the outer sleeve and in which a high precision of control over the rate at which fluid flow through the valve is achieved.

Furthermore, it is an object of the invention to provide such a flow control valve which is inexpensive to manufacture and which can be manufactured using standard machining operations.

Most generally, these as well as other objects of the invention may be met by providing the combination of a valve member of solid material having a passage for flow of fluid therethrough and an O-ring, the distance between at least a portion of the O-ring and the passage or outlet of the passage being variable by control means to vary the flow rate of fluid therethrough. The O-ring may be mounted within a slot in either the valve body or a substantially cylindrical sleeve positioned around the valve body.

Also, objects of the invention may be met by providing a valve having a valve body with a longitudinal bore extending at least partially therethrough with first one or more radial apertures therein and an O-ring which is movable with respect to the first one or more apertures to vary the rate of fluid flow through the first one or more radial apertures. Within the description of the invention herein, the term O-ring includes any closed loop of rubber or rubber-like material. The cross-section may be substantially circular, square, or any other desired shape. The outer closed perimeter of the O-ring may be substantially round, elliptical, lobed as in a clover-shape or any other shape. The combination preferably further comprises a cylindrical sleeve, the sleeve having a slot therein with the O-ring positioned in the slot. The valve body is positioned within the sleeve and the slot and O-ring extend radially around the valve body with the center of the O-ring being offset from the center longitudinal axis of the valve body. The sleeve is rotatable around the valve body in some embodiments and the sleeve may be coupled to the valve body by screw threads. The sleeve in some embodiments is translatable along the valve body. In some embodiments of the invention, the O-ring substantially blocks the flow of fluid through the first one or more radial apertures at at least one position of the sleeve's rotation. Second one or more radial apertures may be provided in the valve body with a passage provided for fluid flow between the first one or more radial apertures and the second one or more radial apertures. Inlet and outlet ports may also be provided at each end of the valve body with the bore extending between the inlet and the outlet ports with a check valve being positioned in the bore with the check valve restricting the flow of fluid between the inlet and outlet apertures within the bore in one direction of flow. In a second embodiment of the invention, inlet and outlet ports are provided at each end of the valve body, a first portion of the longitudinal bore extends from the inlet port to at least the first one or more apertures and a second portion of the longitudinal bore extends from the outlet port to the second one or more radial apertures, flow of fluid being blocked between the first and second portions of the bore. In each of the two embodiments described, means may be provided for sealing the end portions of the sleeve around the valve body. Porous material may be positioned within the inlet aperture in any of the embodiments of the invention to restrict the flow of fluid therethrough by a predetermined amount.

Objects of the invention may also be met by providing a valve which comprises in combination a substantially cylindrical valve body having inlet and outlet ports at opposed ends, with a longitudinal bore extending from the inlet port at least partially through the valve body, a radial inlet aperture extending from a portion of the longitudinal bore through the valve body and an outlet radial aperture extending from a portion of the longitudinal bore from which fluid is free to flow to the outlet aperture, a rotatable cylindrical sleeve positioned around at least portions of the valve body with a passage for flow of fluid being provided between the inlet and outlet radial apertures between portions of the inner surface of the rotatable sleeve and portions of the outer surface of the valve body for at least some rotational positions of the rotatable sleeve, the rotatable cylindrical sleeve having a toroidally shaped slot with an inner portion substantially around the inlet radial aperture with the plane of the slot being substantially parallel to the plane of the cylindrical sleeve and with the center of the slot being offset from the center line of the cylindrical sleeve, and an O-ring positioned with the slot, rotation of the cylindrical sleeve causing the distance between the inner surfaces of the O-ring and the outer portion of the inlet radial aperture to vary as the sleeve is rotated. Preferably, a first portion of the longitudinal bore extends into the valve body at least as far as the inlet radial aperture and a second portion of the longitudinal bore extends into the valve body from the outlet port at least as far as the outlet radial aperture, flow of fluid between the first and second portions of the longitudinal bore being blocked in each direction of flow except for flow of fluid through the inlet and outlet apertures. The longitudinal bore extends in some embodiments through the valve body with fluid being substantially free to flow directly from the outlet port to the inlet port but fluid flow from the inlet port to the outlet port occurring only through the inlet and outlet radial apertures. In that case, means is provided for blocking the flow fluid directly from the inlet port to the outlet port and for allowing the flow of fluid directly from the outlet port to the inlet port, the blocking means preferably comprising a poppet or other type check valve with a seat for the check valve within the valve body, the seat being cut into portions of the longitudinal bore with a spring for pushing the poppet check valve against the seat, the force of the spring being resisted for flow of fluid from the outlet port to the inlet port. As in other embodiments, means may be provided for sealing the end portions of the cylindrical sleeve around the valve body, O-rings being the preferred means for accomplishing the sealing function. The inlet and outlet ports include threaded portions.

An embodiment of the invention as a control valve adapted to be mounted upon a control panel the objects of the invention may be met by providing a valve body having one or more substantially cylindrical portions which also has inlet and outlet ports and an end portion of the valve body with an inlet passage extending from the end portion of the valve through at least a portion of the valve body to an inlet radial aperture which extends through the valve body outward from the inlet passage, the valve body also having an outlet passage extending from the end portions of the valve through a second portion of the valve body to an outlet radial aperture, the outlet radial aperture also extending through the valve body but outward from the outlet passage. Also provided is a rotatable knob housing, portions of which are substantially cylindrical, the rotatable knob housing being positioned around at least a portion of the valve body, the rotatable knob housing having a slot in inner portions thereof substantially around the inlet radial aperture with the center of the slot being offset from the center line of the cylindrical portions of the rotatable knob housing. An O-ring is positioned with the slot, rotation of the rotatable knob housing causing the distance between the inner surface fo the O-ring and outer portions of the inlet radial aperture to vary. A passage is preferably formed for fluid flow between the inlet and outlet radial apertures between inner portions of the rotatable knob housing and outer portions of the valve body. The plane of the O-ring is preferably substantially parallel to a plane intersecting the center axis of the cylindrical portions of the rotatable knob housing at a right angle. The combination may further comprise a directional flow control means for controlling the flow of fluid between the inlet passage and the outlet passage, the directional flow control means operating to block the flow of fluid from the inlet passage to the outlet passage except through the inlet aperture and out the outlet radial aperture and operating to permit the flow of fluid directly from the outlet passage back to the inlet passage. The directional flow control means preferably comprises a poppet or other type check valve. Means may also be provided for sealing the rotatable knob housing around the valve body. The preferred sealing means is one or more O-rings located on either side of the passage which permits flow fluid between inlet and outlet radial apertures. The end portions of the valve body may extend through the control panel and a portion of the valve body may form a flange for mounting the control valve upon the control panel. The inlet and outlet ports may each comprise threaded portions of the inlet and outlet passages in the end portions of the valve body. In a variation of this embodiment, a control O-ring is positioned in a slot within the flanged portion of the rotatable knob housing. The slot is concentric with the center longitudinal axis of the valve body with the depth of the slot into the knob housing being varied. An inlet aperture is positioned in the flanged portion of the valve body under the O-ring.

Other objects of the invention may be met by a valve which comprises a valve body having a longitudinal bore extending at least partially through the valve body and which has one or more inlet radial apertures extending from the longitudinal bore through the valve body. One or more O-rings movable with respect to the one or more radial apertures serve to vary the flow of fluid out of the radial apertures. Means is provided for holding the O-rings and for moving the O-rings with respect to the apertures, the number of the radial apertures and/or the shape of the radial apertures and/or the placement of the radial apertures in or on the valve body being chosen in accordance with predetermined characteristics of the flow rate of fluid through the radial apertures with respect to a positional characteristic of the O-rings. The holding means in this embodiment preferably comprises a substantially cylindrical sleeve having one or more slots in inner portions thereof with the sleeve being positioned around the valve body. Rotation of the sleeve causes the aforementioned variation of the position of the O-rings with respect to the radial apertures. In a preferred embodiment, the radial apertures are two or more in number, the cross-sectional area of at least some of the radial apertures being different from cross-sectional areas of other ones of the apertures. In another embodiment of the invention, the radial apertures are one in number, that single aperture having substantially rectangular shape. In still another embodiment of the invention, there is again provided one radial aperture, that radial aperture having a substantially diamond shape. In still another embodiment of the invention, a single radial aperture may have a substantially oval shape. The flow rate of fluid in at least some embodiments of the invention is, because of the shape or position of the characteristics of the radial apertures, able to be varied linearly with respect to the angular rotational position of the cylindrical sleeve around and with respect to the valve body.

DESCRIPTION OF THE PREFERRED EMBODIMENTS

Figures 1, 5, 6, 8:
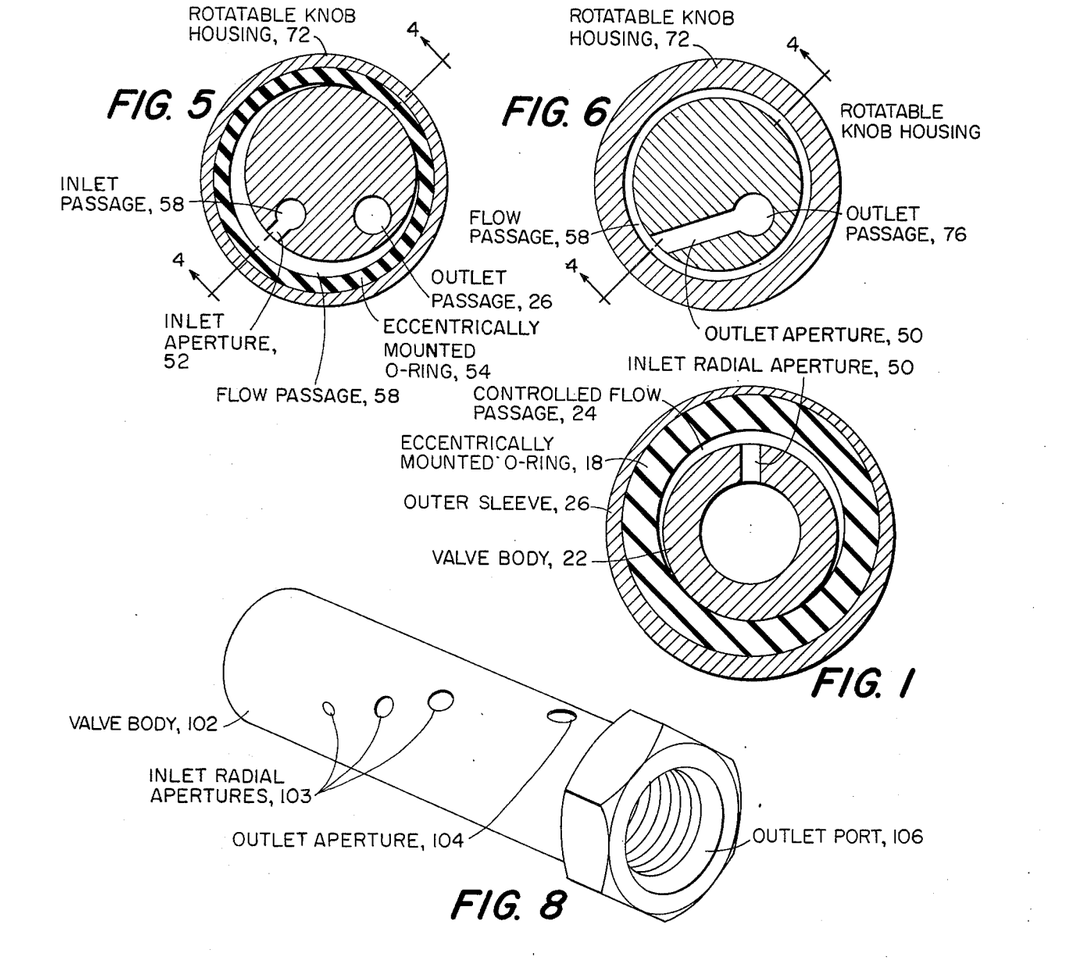
FIG. 1 is a partially cut-away perspective view of an embodiment of the invention as a flow control sleeve valve.
FIGS. 5 and 6 are cross-sectional views taken through the device shown in FIG. 4.
FIG. 8 shows an alternative construction of the valve body used in the device shown in FIG. 1.
Figure 2:
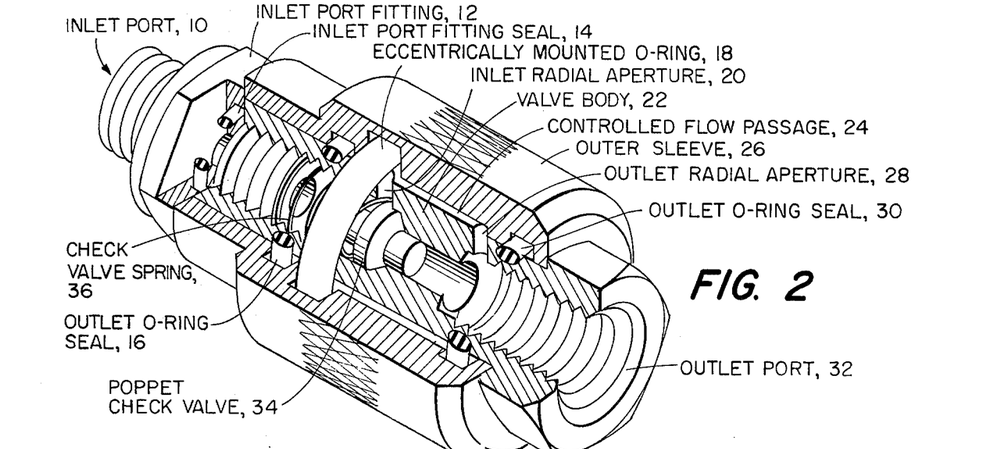
FIG. 2 is a cross-sectional view of the embodiment shown in FIG. 1 taken along or through the eccentrically mounted O-ring and radial aperture shown therein.
Figure 3:
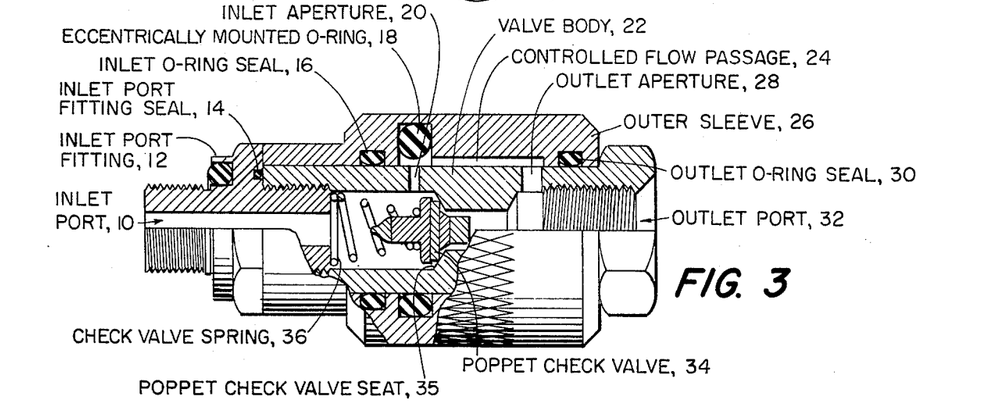
FIG. 3 is a longitudinal cross-sectional view of the device shown in FIG. 1.

A first embodiment of the invention as a flow control sleeve valve is shown in the views of FIGS. 1, 2, and 3 where like numbers and component names refer to the same element throughout. Fluid flows inward through inlet port 10 which includes a threaded fitting of standard dimension adapted for direct connection of the valve in a fluid carrying line. O-ring seal 11 is provided outside the threaded portions of inlet port 10 to provide effective sealing with a fluid fitting screwed onto inlet port 10. Inlet port fitting 12 includes a substantially cylindrical portion threaded at both ends with a longitudinal flow passage through the center thereof. The inner thread of inlet port 12 mates with and screws into the female threaded portion of valve body 22. Inlet port fitting seal 14 provides a barrier against fluid leakage between the mated portions of inlet port fitting 12 and valve body 22.

Valve body 22 is a substantially cylindrical metal member having a longitudinal passage extending therethrough, with the left portion as shown in FIGS. 1 and 3 threaded to mate with inlet port fitting 12 and with the right-hand portion shown in FIGS. 1 and 3 as outlet port 32 threaded to mate with a standard fluid coupling hose or fitting as is inlet port 10.

Poppet check valve 34 is provided within the longitudinal passage through valve body 22 to prevent the flow of fluid directly from inlet port 10 through the longitudinal passage through valve body 22 to outlet port 32. Pressure from fluid flowing inward from inlet port 10 along with the pressure from check valve spring 36 pushes poppet check valve 34 into poppet check valve seat 35 formed in the longitudinal passage. Fluid flow is permitted in the reverse direction from outlet port 32 through the longitudinal passage to inlet port 10 as the pressure from the fluid flowing inwards from outlet port 32 pushes against the face of poppet check valve 34 forcing back check valve spring 36 pushing poppet check valve 34 out of poppet check valve seat 35 and opening the passage therethrough. Fluid flowing inward from inlet port 10, as it is not permitted to flow directly through the longitudinal passage involved body 22, is forced to flow through radial inlet aperture 20, through controlled flow passage 24, then outward through outlet radial aperture 28 to outlet port 32.

Rotatable sleeve 26 is a substantially cylindrical element rotatably positioned around the center portion of valve body 22. O-ring seals 16 and 30 seal the ends of rotatable sleeve 26 against fluid flow or leakage between the outer portions of rotatable sleeve 26 and valve body 22. Flow passage 24 is provided between valve body 22 and rotatable sleeve 26 as an hollowed out or indented portion of rotatable sleeve 26.

Eccentric slot 17 is provided in the inner surface of rotatable sleeve 26 in the same plane as inlet aperture 20. Eccentric slot 17 has a substantially circular outer edge with the center of that circle being displaced from the center of rotatable sleeve 26 and the center line of the longitudinal passage through valve body 22.

Within eccentric slot 17 is positioned normally toroidally shaped eccentrically mounted O-ring 18. The center of the inner surface of eccentrically mounted O-ring 18 is substantially over the center of inlet aperture 20. Rotation of rotatable sleeve 26 causes the distance between the inner surface of eccentrically mounted O-ring 18 and the outer edge of inlet aperture to vary dependent upon the angle of rotation of rotatable sleeve 27 with respect to valve body 22. As the rate at which fluid is permitted to flow from inlet aperture 20 is dependent upon the distance between the inner surface of eccentrically mounted O-ring and the outer portion of inlet aperture 20, the rate at which fluid flows from inlet port 10 to outlet port 32 is also dependent upon the angular position of rotatable sleeve 26 with respect to valve body 22. Fluid flowing through inlet aperture 20 past eccentrically mounted O-ring 18 flows through control flow passage 24 and outlet aperture 28 through to outlet port 32. The diameter of outlet aperture 28 should normally be greater than that of inlet aperture 20 to not further restrict the flow of fluid outward from the valve.

The depth and dimensions of eccentric slot 17 may vary according to the particular fluid control application. Ordinarily, the depth of eccentric slot 17 should be sufficiently small at its smallest depth to compress eccentrically mounted O-ring 18 to insure a tight fit around valve body 22 and also so that the flow of fluid from inlet port 10 to outlet port 32 may entirely be closed off. In other applications, it may be desired to provide a flow control valve where the fluid flow may not be entirely turned off at any position of rotatable sleeve 26. In that case, the depth of eccentric slot 17 should be such that the inner surface of eccentrically mounted O-ring 18 does not come in contact with valve body 22 for any position of rotatable sleeve 26.

It has been found that with a flow control valve as constructed in accordance with the invention the rate of fluid flow through the valve can be a much more linear function of the angle of rotation of the control knob or sleeve than has heretobefore been obtained with a simply constructed non-feedback flow control valve. In FIG. 8 is shown a graph of the rate of fluid flow through a valve of the invention. As can readily be seen therein, the rate of flow is substantially linear function of the angle of rotation of rotatable sleeve 36 with respect to valve body 22.

Figure 9:
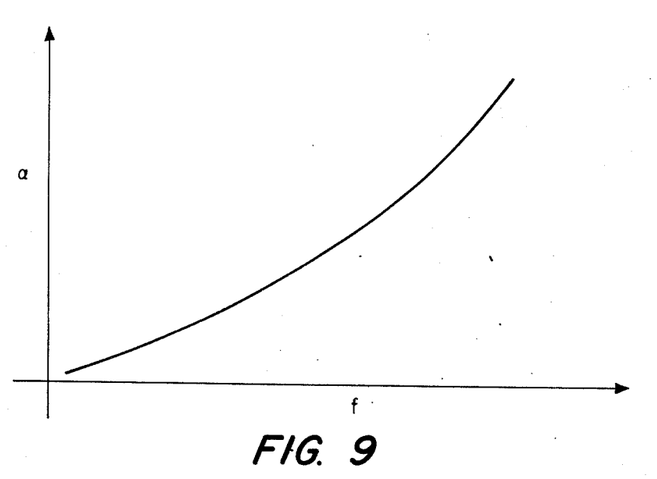
FIG. 9 shows a graph of the flow rate of fluid out of a valve versus the operation angle of the control means of a valve constructed in accordance with the present invention.
Figure 10:
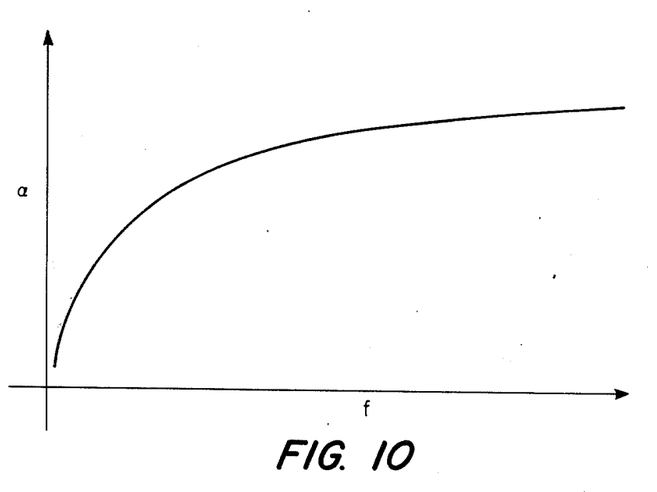
FIG. 10 shows a similar curve for a control valve of the prior art.

FIG. 9 shows a similar graph for a device of the prior art such as a needle valve. In the case of the prior art device, the fluid flow rate increases very rapidly for low rates of flow as the valve begins to open. Through the center portions of the curve the flow rate is not a strong function of the angle of rotation of the control knob such that large amounts of rotation provide only a small change in the rate of fluid flow. Hence, at both small and large rates of fluid flow with the prior art device it is quite difficult to precisely control the rate of fluid flow. It is also difficult to provide a calibrated scale upon which the rate of fluid flow is calibrated directly against knob position because of the gross nonlinearities involved. On the other hand, with the present invention, to calibrate such a scale is quite straight forward and easy to accomplish because of the inherent linearities of the device. To achieve such a linear relationship between rate of fluid flow and position of the control sleeve or knob previously required the use of feedback control or difficult to manufacture valve geometries. Thus, the present invention provides a more easy to manufacture and inexpensive valve than was heretobefore possible with the devices of the prior art.

Reference is made next to FIG. 8 in which is shown an alternative construction of the valve body of a sleeve valve device of the type shown in FIGS. 1-3. Valve body 102 of FIG. 8 has the same basic construction as valve body 22 of FIGS. 1-3 with the exception that the single inlet radial aperture 20 of the previously described device has been replaced by three such inlet radial apertures 103. Each of the three inlet radial apertures 103 is located at a different distance from outlet aperture 104 which is formed as before. Also, each has a different diameter, the smallest diameter inlet radial aperture being located farthest from outlet radial aperture 104 and the largest nearest outlet radial aperture 104. A separate eccentrically mounted O-ring is required within the cylindrical sleeve to be positioned around valve body 103. Each of the three inlet radial apertures 103 are covered by its respective O-ring when the valve is closed. The three O-rings are mounted such that as the valve begins to open only the smallest inlet radial aperture is uncovered. As the flow rate is increased, the second inlet radial aperture is uncovered finally as the flow rate is further increased, the third and largest inlet radial aperture is uncovered. The flow rate is of course continually varied between the uncoverings of each inlet radial aperture. This embodiment of the invention shown in FIG. 8 is particularly useful in maintaining a high degree of control over the flow rate at low rates.

In other embodiments of the invention, a plug of porous or semiporous material such as sintered metal, plastic open cell foam, or sponge rubber is inserted in one or more of the inlet radial apertures to lower the flow rate of fluid through the aperture as previously described. In this manner, small fluid flow rates may be accommodated using larger inlet radial apertures than would ordinarily be required. Generally, the cross-sectional area of the outlet aperture or apertures should be equal to or greater than the total cross-sectional area of the inlet aperture or apertures. In the case that porous material is positioned within any of the radial apertures, the total area of the inlet apertures may be taken as the area of the apertures divided by the porosity factor.

Other means may be provided for varying the distance between the O-ring and the inlet aperture. The rotatable sleeve of FIGS. 1-3 may be replaced by a translating or slidable sleeve with the O-ring mounted there. The center of the O-ring in that case may be eccentrically mounted as before or substantially concentric with the center longitudinal axis of the valve body. Movement of the sleeve produces translation of the O-ring along the valve body with the inner surface of the O-ring covering the inlet aperture to an extent dependent upon the linear position of the sleeve.

In a variation upon the translatable sleeve embodiment of the invention, the valve body is threaded on its outer surface and the sleeve threaded on its inner surface such that rotation of the sleeve produces translation of the sleeve and O-ring.

In other embodiments of the invention, the O-ring is mounted such that the amount of eccentricity of the O-ring with respect to the longitudinal axis of the valve body is varied as a function of control device position. The flow may be shut off or at its minimum valve with the center of the O-ring lying along the longitudinal axis and with the flow increased to its maximum value at maximum eccentricity.

In any of the embodiments herein described, the slot in which the O-ring is mounted may be non-circular. The shape of the slot may be varied to produce a desired relationship between the flow rate and position of the control sleeve, knob, or other flow rate control means. For example, the shape of the slot may be structured such that at control positions corresponding to low flow rates a large change in control device position produces a relatively large change in fluid flow rate. This variation is especially useful in applications requiring a high degree of control at low fluid rates.

To ensure repeatability of the same flow rate for the same valve position each time the sleeve is rotated, the sides of the slot within which the O-ring is mounted should put sufficient squeeze on the sides of the O-ring so that the O-ring does not rotate within the slot. This feature is desirable in cases in which the cross-sectional dimensions of the O-ring can vary due to manufacturing tolerances.

Figure 11:
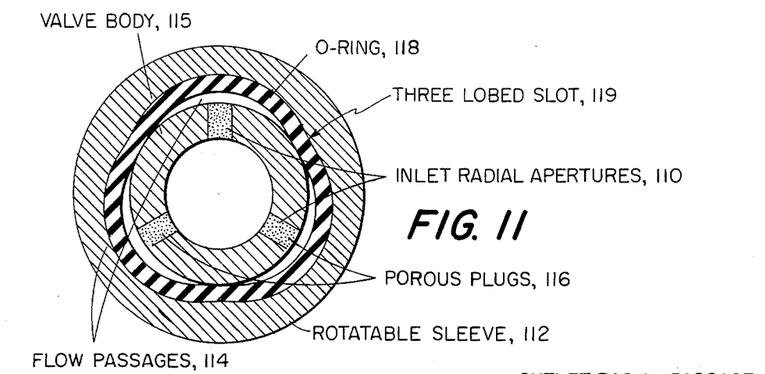
FIG. 11 shows a cross-sectional view of another alternative embodiment of the device shown in FIGS. 1-3.

In FIG. 11 is shown an alternative construction of the device of FIGS. 1-3 in a cross-sectional view taken in the same plane as FIG. 2. Extending through valve body 115 are three inlet radial apertures 110 located at approximately 120° intervals around valve body 115. Within each inlet radial aperture 110 is positioned a porous plug 116 which may be formed of sintered metal, plastic open cell foam, or sponge rubber. Because the flow rate of fluid through each inlet radial aperture 110 with the presence of porous plugs 116 is cut down over that through the aperture without such a plug by the porosity factor of the porous material, large diameters may be used with the presence of porous plugs 116. For example, in an application which would require inlet radial apertures 110 to have a diameter of 0.003 inches, diameters of 0.03 inches may be used with porous plugs having a porosity factor of 10. In many cases, the larger size holes are easier to accomplish in manufacture.

A three lobed slot 119 is provided within rotatable sleeve 112 and O-ring 118 positioned therein. The dimensions of three lobed slot 119 and O-ring 118 are such that O-ring 118 is compressed against valve body 115 along three segments with open flow passages 114 also provided. At one or more rotational positions of rotatable sleeve 112, all three inlet radial apertures are covered and fluid flow prohibited. Further rotations of rotatable sleeve 112 varies the amount of coverage of O-ring 118 over inlet radial apertures 110 thus varying the flow rate of fluid. The center of O-ring 118 need not be offset from the longitudinal axis of valve body 115 as in previously described examples.

Figure 12:
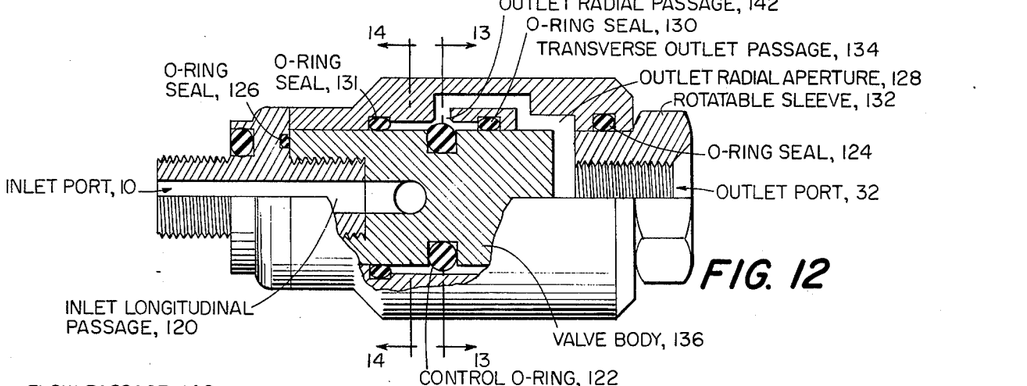
FIG. 12 shows a partially cut-away cross-sectional view of an alternative embodiment of the invention.
Figures 13, 14:
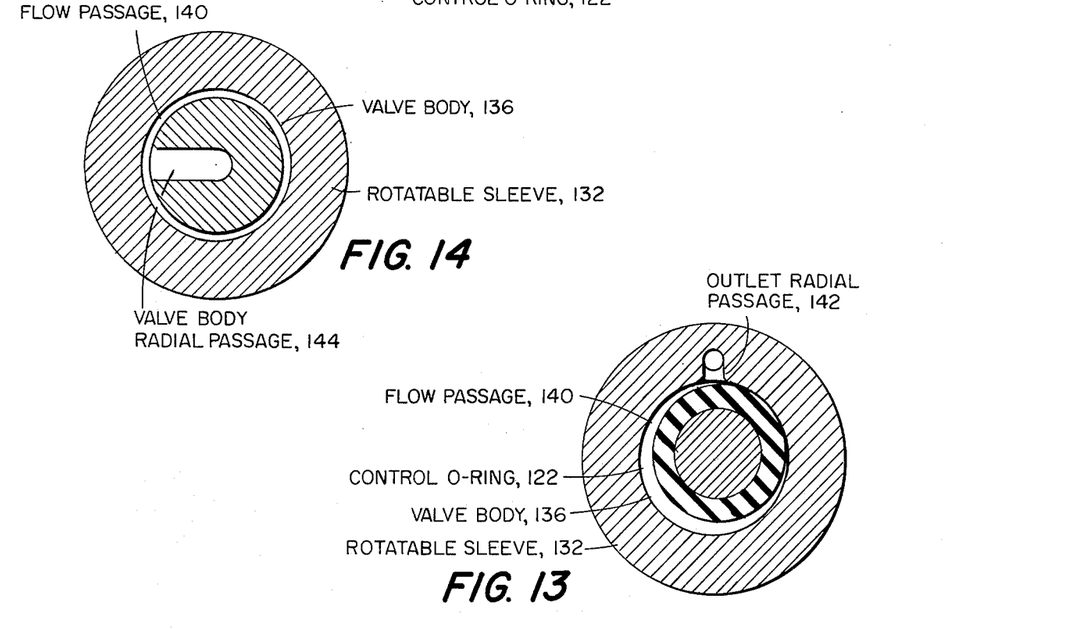
FIGS. 13 and 14 are cross-sectional views of the device shown in FIG. 12.

A still further embodiment of the invention as a rotatable sleeve metering valve is shown in FIGS. 12-14. Control O-ring 122 is mounted within a toroidally shaped slot within valve body 136 with the center of O-ring 122 and the slot lying along the center longitudinal axis of substantially cylindrically shaped valve body 136. Incoming fluid from inlet port 10 flows through inlet longitudinal passage 120 then radially outward through valve body radial passage 144 into flow passage 140. Flow passage 140, which is crescent shaped in cross-section, is formed between valve body 136 and rotatable sleeve 132 which is mounted around valve body 136. The center hollow portion of rotatable sleeve 132 may be of circular or other convenient shape the center of which is offset from the center longitudinal axis of the valve body 136.

Fluid flows along flow passage 140 to the region of control O-ring 122. Control O-ring 122 is positioned directly under the center of outlet radial passage 142. Rotation of rotatable sleeve 132 varies the distance between the intersection between outlet radial passage 142 and the inner surface of rotatable sleeve 132 and control O-ring 122 to thereby vary the flow rate of fluid through the valve. Fluid exits through transverse outlet passage 134 and outlet radial aperture 128 to outlet port 132. O-ring seals 124, 126, 130, and 131 prevent fluid leakage between rotatable sleeve 132 and valve body 136.

The device shown in FIGS. 12-14 may be converted from the metering valve shown therein to a flow control valve if inlet longitudinal passage is extended through valve body 136 to outlet port 32 with a check valve positioned in the resulting passage between outlet port 32 and the intersection of valve body 136 and valve body radial passage 144. Moreover, any embodiments of the invention as a metering valve may be converted to a flow control valve by the addition of a passage between inlet and outlet ports with a check valve positioned therein. A poppet check valve as shown in FIGS. 1 and 3 may be used, a swing check valve, or any other type of check valve which may be adapted for use with the application.

Figure 4:
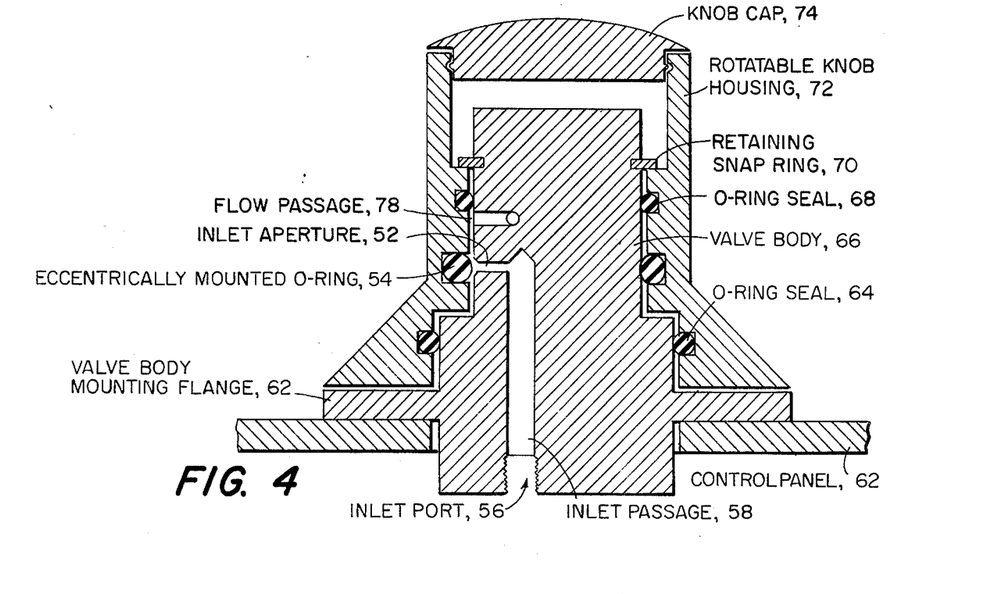
FIG. 4 is an alternative embodiment of the invention as used as a panel mounted metering valve.
Figure 7:
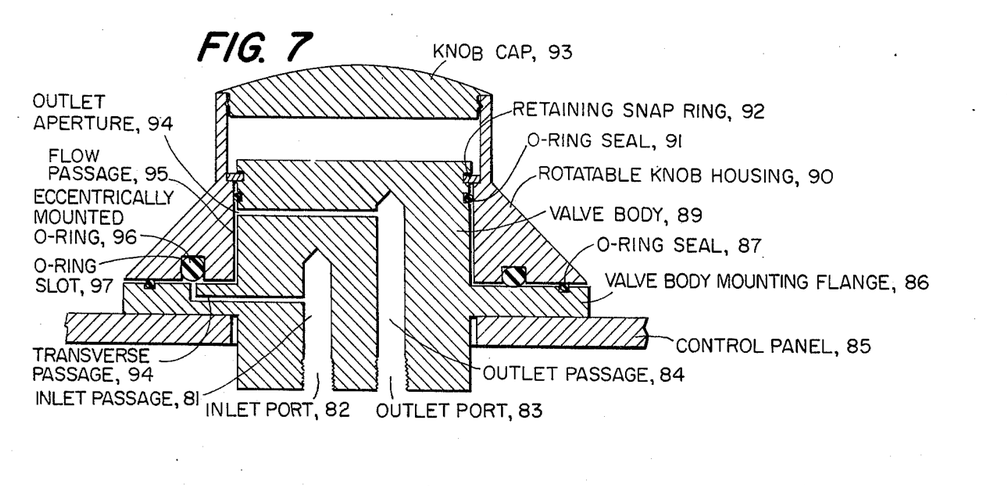
FIG. 7 shows an alternative embodiment of a control panel mounted metering valve.

In FIGS. 4 and 7 are shown embodiments of the invention as a control panel mounted metering valve with control upon the rate of fluid flow through the valve determined by the rotational position of a rotatable control knob. FIGS. 6 and 7 show cross-sectional views of the device of FIG. 5 which are helpful in understanding the operation of the device.

The device shown in FIG. 5 will be described first. Valve body 66 is a substantially cylindrically shaped metal element having an inlet passage 58 and an outlet passage 76 formed longitudinally therein. The outer portion of each includes a threaded section for coupling thereto of piping or hoses having standard fittings. A valve body mounting flange 62 extending outward from the main portion of valve body 66 provides means for mounting the valve device upon control panel 60 with the end portion of valve body 66 extending therethrough. Mounting holes may be provided through valve body mounting flange 62 for bolting the valve device to control panel 60.

Inlet passage 58 extends longitudinally inward through valve body 66 at least as far as inlet aperture 52 which extends radially outward through valve body 66 from inlet passage 58. Inlet passage 58 is formed preferably nearer the outer portion of inlet aperture 52 than the geometrical center axis of valve body 58 so that inlet aperture 52 does not in itself substantially restrict the flow of fluid therethrough by acting as a long thin tube.

Outlet passage 76 also extends longitudinally through valve body 66 but further into valve body 66 than inlet passage 58. Outlet aperture 50 is formed as a transverse passage through valve body 66 between outlet passage 76 and the outer surface of valve body 66 above the outer portion of inlet aperture 52. Preferably, inlet aperture 52 and outlet aperture 50 intersect the outer surface of valve body 66 at approximately the same radial angle. Also, the diameter of outlet passage 76 is greater than that of inlet passage 58 and the diameter of outlet aperture 50 is greater that that of inlet aperture 52 to prevent restriction upon the flow of fluid through the valve by restriction effects of a long thin tube as outlet passage 76 and outlet aperture 50 are located further from the surface of valve body 66 at which inlet aperture 52 and outlet aperture 50 intersect the surface of valve body 66 than inlet passage 58 and inlet aperture 52.

Rotatable knob housing 72 is mounted and positioned around valve body 66. Retaining snap ring 70, fitted within a toroidally shaped slot in valve body 66 secures rotatable knob housing in place around valve body 66. Dome shaped knob cap 74 is fitted into the end portion of rotatable knob housing 72 and held in place by retaining ring 73 formed as a portion of knob cap 74 and fitted into knob cap retaining slot 71 or by any suitable construction.

Eccentric slot 55 is formed inside rotatable knob housing 72 as a toroidally shaped slot with the center of the toroid offset from the center longitudinal axes of rotatable knob housing 72 and valve body 66, the latter two axes being substantially co-linear. The plane of the toroid is preferably perpendicular to the two axes. The center of eccentric slot 55 is at the same level as the center of the intersection of inlet aperture 52 with the outer surface of valve body 66.

Within eccentric slot 55 is positioned eccentrically mounted O-ring 54. Because of the eccentricity of eccentric slot 55, as was the case with the previous embodiment shown in FIGS. 1-3, rotation of rotatable knob housing 72 varies the distance between the inner surface of eccentrically mounted O-ring 54 and the intersection of inlet aperture 52 with the outer surface of valve body 66. Control of the rate of fluid flow through the valve device is accomplished in the same manner as with the embodiment shown in FIGS. 1-3. Moreover, all of the advantages of the previously described embodiment including linearity of the rotational position of rotatable knob housing with respect to fluid flow rate are attained with the instantly described embodiment.

Many of the variations upon the embodiment of the invention shown in FIGS. 1–3 may also be practiced with the instant embodiment. For example, a plurality of inlet apertures may be provided between inlet passage 58 and the outer surface of valve body 66. The inlet apertures may be of varying diameter and cross-sectional shape depending upon the desired relationship between the rotational position of rotatable knob housing 72 and the flow rate of fluid through the device. If the plural inlet apertures are spaced along the length of valve body 66, a separate eccentrically mounted O-ring may be provided for each inlet aperture. If the plural inlet apertures are positioned with their intersections with the surface of valve body 66 at other than a straight line parallel to the longitudinal axis of valve body 66, the centers of the plural eccentrically mounted O-rings will also not be co-linear.

Flow passage 78 is provided between inlet aperture 52 and outlet aperture 50 as a spacing between rotatable knob housing 72 and valve body 66 maintained between the two apertures for all positions of rotatable knob housing 72.

Leakage of fluid between rotatable knob housing 72 and valve body 66 outside inlet aperture 52 and outlet aperture 50 is prevented by O-ring seals 64 and 68. Each are positioned within annularly shaped slots in rotatable knob housing 72.

In FIG. 7 is shown an alternative embodiment of the invention as a control panel mounted metering valve similar to the embodiment shown in FIGS. 4–6 but with the eccentrically mounted O-ring positioned within the flanged portion of the rotatable knob housing. Knob cap 93 and retaining snap ring 92 function as in the previously described embodiment. Transverse passage 94 extends outward from inlet passage 81 through valve body 89 including a portion of valve body mounting flange 86 which is an integral portion of valve body 89. Inlet aperture 80 extends from the outward most portion of transverse passage 94 to the outer surface of valve body mounting flange 86 directly below the center of eccentrically mounted O-ring 96.

Eccentrically mounted O-ring 96 is positioned with slot 97. Slot 97 is an annularly shaped slot within the underside of the flanged portion of rotatable knob housing 90. In this embodiment, the center of toroidally shaped slot 97 may fall along the center longitudinal axis of valve body 89. However, the depth slot 97 extends into the flanged portion of rotatable knob housing 90. In this embodiment, the center of toroidally shaped slot 97 may fall along the center longitudinal axis of valve body 89. However, the depth slot 97 extends into the flanged portion of rotatable knob housing 90 and is varied such that rotation of rotatable knob housing 90 varies the spacing between the lower surface of eccentrically mounted O-ring 96 and inlet aperture 80. The flow rate of fluid through the valve device is thereby controlled.

Flow passage 95 is provided for free flow of fluid between inlet aperture 80 and outlet aperture 94. Outlet aperture 94 is, as in the previously described embodiment, of greater diameter than inlet aperture 80 so that fluid flow is not substantially restricted due to the long thin tube effect. Transverse passage 94 should also be of sufficient cross-section to prevent this undesirable effect. O-ring seals 87 and 91 perform the same function as before in preventing the leakage of fluid.

The embodiment of the invention shown here in FIG. 7 is capable of attaining the same advantages as those embodiments previously described. Multiple inlet apertures may be provided in valve body mounting flange 86 at varying radial distances from the center of valve body 89. Concentric eccentrically mounted O-rings may then be provided along the flanged portion of rotatable knob housing 90, one for each inlet aperture. Alternatively, one O-ring may function with more than one inlet aperture if all inlet apertures associated wih that particular O-ring are located at the same radial distance from the center of valve body 89.

This concludes the description of the preferred embodiments of the invention. Although preferred embodiments have been described, numerous modifications and alterations would be apparent to one having ordinary skill in the art without departing from the spirit and scope of the invention.

What is claimed is:

1. A valve comprising in combination:
    a valve body having a longitudinal bore extending at least partially therethrough having first one or more radial apertures therein;
    one or more O-rings, the distance between a portion of said O-ring and said first one or more radial apertures being variable to vary the rate of fluid flow through said first one or more radial apertures;
    a cylindrical sleeve, said sleeve having a slot therein, and said O-ring being positioned in said slot; and
    wherein said valve body is positioned within said sleeve and said slot and said O-ring extend radially around said valve body, the center of said O-ring being offset from the longitudinal axis of said valve body.

2. The combination of claim 1 wherein the distance between said center of said O-ring and said longitudinal axis is variable.

3. The combination of claim 2 wherein said sleeve is rotatable around said valve body.

4. The combination of claim 2 wherein said O-ring substantially blocks the flow of fluid through said first one or more radial apertures at at least one position of said sleeve.

5. The combination of claim 3 further comprising:
    second one or more radial apertures in said valve body.

6. The combination of claim 5 wherein a passage is provided for fluid flow between said first mentioned one or more radial apertures and said second one or more radial apertures.

7. The combination of claim 6 further comprising:
    inlet and outlet ports at each end of said valve body, said bore extending between said inlet and outlet ports; and
    a check valve, said check valve being positioned in said bore and said check valve restricting the flow of fluid through said bore in one direction therethrough.

8. The combination of claim 6 further comprising:
    means for sealing the end portions of said sleeve around said valve body.

9. A valve comprising in combination:
    a substantially cylindrical valve body having inlet and outlet ports at opposed ends thereof, a longitudinal bore extending from said inlet port at least partially through said valve body, one or more inlet radial apertures extending from a first portion of said longitudinal bore through said valve body, and an outlet radial aperture extending from a second portion of said longitudinal bore to said outlet aperture;

a rotatable cylindrical sleeve, said sleeve positioned around at least portions of said valve body, a passage for flow of fluid between said inlet radial aperture and said outlet radial aperture being formed between portions of the inner surface of said rotatable cylindrical sleeve and portions of the outer surface of said valve body for at least some rotation positions of said rotatable sleeve, and said rotatable cylindrical sleeve having an annuarly shaped slot within inner portions thereof substantially around said inlet radial aperture, the plane of said slot being substantially parallel with the plane of said cylindrical sleeve and the center of said slot being offset from the center line of said cylindrical sleeve; and an O-ring positioned within said slot, rotation of said cylindrical sleeve causing the distance between the inner surface of said O-ring and the outer portion of said inlet radial aperture to vary.

10. The combination of claim 9 wherein said longitudinal bore extends through said valve body, fluid being substantially free to flow directly from said outlet port to said inlet port and fluid flow from said inlet port to said outlet port occurring only through said inlet and outlet radial apertures.

11. The combination of claim 10 further comprising:
means for blocking the flow of fluid directly from said inlet port to said outlet port and for allowing the flow of fluid directly from said outlet port to said inlet port.

12. The combination of claim 11 wherein said blocking means comprises:
a poppet check valve;
a seat for said check valve within said valve body around a portion of said longitudinal bore; and
a spring for pushing said poppet check valve against said seat the force of said spring being resisted for flow of fluid from said outlet port to said inlet port.

13. The combination of claim 11 further comprising:
means for sealing end portions of said cylindrical sleeve around said valve body.

14. The combination of claim 13 wherein said sealing means comprises O-rings.

15. The combination of claim 14 wherein said inlet and outlet ports comprise threaded sleeves.

16. A valve comprising in combination:
a valve body having a longitudinal bore extending at least partially therethrough and having one or more inlet radial apertures extending therethrough from said longitudinal bore;
one or more O-rings, said O-rings being movable with respect to said one or more radial apertures to vary the flow of fluid therethrough;
means for holding said O-rings and for moving said O-rings with respect to apertures comprising a substantially cylindrical sleeve having one or more slots in inner portions thereof, said sleeve being positioned around said valve body, rotation of said sleeve causing variation of the position of said O-rings with respect to said radial apertures; and
the number of said radial apertures and/or the shape of said radial apertures and/or the placement of said radial apertures in said valve body being chosen in accordance with predetermined characteristics of flow rate of fluid through said radial apertures versus a positional characteristic of said O-rings.

17. The combination of claim 16 wherein said flow rate of fluid is varied substantially linearly with respect to angular rotation of said cylindrical sleeve around said valve body.

* * * * *